United States Patent [19]

Burris

[11] 4,389,501

[45] Jun. 21, 1983

[54] SULFUR MODIFIED EPOXY RESIN SEALING COMPOSITION

[76] Inventor: Michael V. Burris, 1750 Industrial Rd., Las Vegas, Nev. 89102

[21] Appl. No.: 319,633

[22] Filed: Nov. 9, 1981

[51] Int. Cl.³ .............................................. C08L 63/00
[52] U.S. Cl. ................................ 523/400; 525/420.5; 525/423; 528/90; 528/109; 528/389
[58] Field of Search .............. 525/420.5, 423; 528/90, 528/109, 389; 523/400

[56] References Cited

U.S. PATENT DOCUMENTS

| 3,158,581 | 11/1964 | Vandenberg | 528/389 |
| 4,026,831 | 5/1977 | Moriya | 525/423 |
| 4,133,803 | 1/1979 | Klein | 525/423 |
| 4,162,931 | 7/1979 | Yealsey | 525/423 |
| 4,203,878 | 5/1980 | Bauer | 523/400 |

OTHER PUBLICATIONS

Lee et al.: Handbook of Epoxy Resins, McGraw-Hill Book Co., 16-18 to 16-20, (1967).

Primary Examiner—Paul Lieberman
Attorney, Agent, or Firm—Seiler & Quirk

[57] ABSTRACT

The gel time of curable epoxy resin compositions are controllably reduced by adding to the epoxy resin-curing agent mixture between about 0.1 and about 10% elemental sulfur.

4 Claims, No Drawings

SULFUR MODIFIED EPOXY RESIN SEALING COMPOSITION

BACKGROUND OF THE INVENTION

Epoxy resins have been used extensively as sealing compositions and have been particularly useful in coating bridge deck surfaces because of advantageous adhesion and wear qualities. However, slow gel times or pot life of the epoxy resin systems often result in substantial traffic hold up and delay during initial curing, until the resin system has gelled, particularly in cool weather conditions. It is to the elimination of slow gel time problems, and providing for the substantial acceleration of epoxy resin gel times that the compositions of the present invention are directed.

SUMMARY OF THE INVENTION

The improved coating compositions of the present invention comprise epoxy resins which are modified with the addition of sulfur at or prior to curing. The addition of sulfur, in amounts up to about 10%, by weight, yield substantially shorter gel time or pot life.

DETAILED DESCRIPTION OF THE INVENTION

The epoxy resins used in the improved compositions, of the present invention are well known epoxides, characterized by an epoxy group

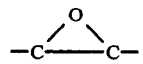

Preferred epoxy resins are polyepoxides having more than one epoxy group per molecule. The resins may be saturated or unsaturated, aliphatic, cycloaliphatic, aromatic, or heterocyclic. The most widely used or common epoxy resins are condensation products of epichlorohydrin and bisphenol A. These resins have molecules with glycidyl ether structures in the terminal positions, have many hydroxyl groups, and cure readily with amine or amide curing agents.

Glycidyl polyethers of polyhydric phenols are preferred resins. In addition to bisphenol A, other polyhydric phenols such as resorcinol, catechol, hydroquinone, methyl resorcinol, or polynuclear phenols, such as 2,2-bis(4-hydroxyphenyl)butane, 20 4,4'-dihydrobenzophenone, bis(4-hydroxyphenyl)ethane, and 1,5-dihydroxynaphthalene may be used. In addition to epichlorohydrin, other halogen-containing epoxides such as 3-chloro-1, 2-epoxybutane, 3-bromo-1,3-epoxyhexane, 3,-chloro-1,2-epoxyoctane, and the like may be used.

The polyepoxides may be monomeric or polymeric, the former exemplified by compounds such as vinyl cyclohexene dioxide, epoxidized soybean oil, butadiene dioxide, 1,4-bis(2,3-epoxypropoxy)benzene, 1,3-bis(2,3-epoxypropoxy)-benzene, 4,4'-bis(2,3-epoxypropoxy)-diphenyl ether, 1,8-bis(2,3-epoxypropoxy)octane, 1,4-bis(2,3-epoxypropoxy) cyclohexane, 4,4'-bis(2-hydroxy-3,4-epoxybutoxy)-diphenyldimethylmethane, and the like. In addition, relatively low cost resins may be prepared from epoxidized coal tar. Other similar, and less expensive epoxy resins may be particularly useful and achieved by epoxidizing other unsaturated materials.

The epoxy resins may be cured with a number of well known epoxide curing agents, examples including alkalies such as sodium or potassium hydroxide, carboxylics acids or anhydrides, Friedal-Crafts metal halides, acids such as phosphoric acid and partial esters, aliphatic, aromatic and heterocyclic amino compounds, for example, diethylene triamine, triethylene tetramine, and the like. Especially preferred are the polyamides containing active amino and/or carboxyl groups, preferably those containing a plurality of amino hydrogen atoms prepared by reacting polybasic acids with a polyamine. The polyamide curing agents are preferred because of ease of handling and relatively low toxicity.

Sulfur is added to the epoxy resin composition of the invention to provide control of gel time. The sulfur added may be in its commercial or technical grade, usually in flour or particulate form. The sulfur can be pre-blended into the epoxy resin, in the curing agent, or in the epoxy-curing agent mix, at the time of blending the final composition. It is preferably added to the epoxy resin, or the blend, rather than to the curing agent because of reaction which occurs with polyamides. Thus, where a premix is desired, the sulfur is readily blended with the epoxy resin to give a mixture having a substantial shelf life until it is to be mixed with the curing agent in the final mix. For certain other of the curing agents, sulfur may be blended without causing substantial reaction, but with the preferred polyamides, premix with the curing agent is not recommended or desirable.

It has been found, according to the invention, that even small amounts of sulfur present during curing of the epoxy resin will result in reduced gel time or pot life. For example, 1.0% sulfur, by weight of the combined resin and curing agent, has been found to result in a 66% reduction in curing time. Thus, according to the invention, amounts up to about 10%, by weight, and preferably between about 0.1 and about 10%, by weight, of elemental sulfur yield the desired pot life reduction. More preferably, amounts of between about 0.5 and about 9% are useful.

Although the sulfur addition results in a temporary reduction of hardness as measured by a Shore D hardness test, original hardness returns substantially after 48 hours, and almost completely or completely after about 72 hours. Moreover, the amount of initial hardness reduction is proportional to the gel time reduction.

The following examples illustrate the compositions of the invention. Unless otherwise indicated, parts and percentages given are by weight.

EXAMPLES 100 parts of epoxy resin (Epi-Rez 5077, Celanese Corporation of America) and 35 parts polyamide curing agent (Epi-Cure 872, Celanese Corporation of America) were blended together with different amounts of powdered sulfur. These compositions were compared with a control composition in which no sulfur was added with the following results:

| % Sulfur | Gel Time (30° C.) Minutes | Shore D Hardness | | |
|---|---|---|---|---|
| | | 24 hrs. | 48 hrs. | 72 hrs. |
| Control | 35 | 70 | 74 | 76 |
| 1 | 23 | 60 | 71 | 72 |
| 3 | 14 | 57 | 72 | 74 |
| 5 | 11 | 65 | 70 | 74 |
| 7 | 7 | 66 | 72 | 75 |
| 9 | 28 | 70 | 75 | 75 |

It will be seen from the above examples that increasing the amount of sulfur up to about 7% significantly reduces the gel time, while the hardness of the composition, although initially affected, recovers to substantially that of the control composition. Accordingly, utilizing the composition and improvement of the invention, the substantial control of the gel time in applications when gel time reduction is essential, may be achieved.

When the composition is to be used for a bridge deck seal or coating, or other surfacing where vehicular traffic is involved, the epoxy resin composition is mixed with sand and/or aggregate prior to or at the time of curing. Moreover, usually more than one coat of the composition is applied to the surface, thereby further emphasizing the importance of using a composition having reduced gel time. The compositions of the invention may also be advantageously used for a number of other applications, for example, protective coatings for concrete walls or other formations on or beneath ground surfaces, particularly necessary where the surrounding soil contains reactive aggregates which otherwise cause deterioration of the concrete. Such a coating may be used on other surfaces, particularly concrete or asphaltic concrete, where moisture-sealing or protection is desired. Other materials, fillers, and the like, commonly used in such coating compositions may also be added to the sulfur modified epoxy resin composition of the invention. These as well as other uses, advantages and modifications of the compositions within the purview of the invention will be understood by those skilled in the art.

I claim:

1. An epoxy resin composition consisting essentially of an epoxy resin, a polyamide curing agent, and between about 0.1 and about 10% by weight of elemental sulfur.

2. A coating composition consisting essentially of
a curable epoxy resin, a polyamide curing agent, and between about 0.1 and about 10% elemental sulfur, by weight, based on said resin and curing agent, and mineral aggregate.

3. A method of reducing the gel time of a composition consisting essentially of epoxy resin and a polyamide curing agent therefor comprising between about 0.1 and about 10% by weight elemental sulfur with said epoxy resin, blending said polyamide curing agent with the epoxy resin and sulfur mixture, and allowing the compositions to cure at ambient temperature.

4. The method of claim 3 wherein the amount of sulfur added is between about 0.5 and about 9%, by weight.

* * * * *